US008737696B2

(12) United States Patent
Gu et al.

(10) Patent No.: US 8,737,696 B2
(45) Date of Patent: May 27, 2014

(54) HUMAN FACE RECOGNITION METHOD AND APPARATUS

(75) Inventors: Ren-Hau Gu, Hsin-Chu (TW); Yu-Hao Huang, Hsin-Chu (TW); Yu-Han Chen, Hsin-Chu (TW); Ming-Tsan Kao, Hsin-Chu (TW); Sen-Huang Huang, Hsin-Chu (TW)

(73) Assignee: Pixart Imaging Inc. (TW)

( * ) Notice: Subject to any disclaimer, the term of this patent is extended or adjusted under 35 U.S.C. 154(b) by 134 days.

(21) Appl. No.: 13/541,050

(22) Filed: Jul. 3, 2012

(65) Prior Publication Data

US 2013/0114852 A1   May 9, 2013

(30) Foreign Application Priority Data

Nov. 7, 2011 (TW) .............................. 100140462 A (51) Int. Cl.
*G06K 9/00* (2006.01)
(52) U.S. Cl.
USPC ............................. 382/118; 348/135; 345/589
(58) Field of Classification Search
USPC ......... 382/100, 115, 117, 118, 162, 165, 181, 382/190, 195, 201, 209, 217, 228; 348/135; 345/589
See application file for complete search history.

(56) References Cited

U.S. PATENT DOCUMENTS

| 7,555,148 | B1 * | 6/2009 | Steinberg et al. | 382/118 |
|---|---|---|---|---|
| 7,590,283 | B2 * | 9/2009 | Ruark et al. | 382/167 |
| 7,711,157 | B2 * | 5/2010 | Duong et al. | 382/118 |
| 8,411,909 | B1 * | 4/2013 | Zhao et al. | 382/116 |
| 8,600,909 | B2 * | 12/2013 | Gullo et al. | 705/335 |
| 8,611,616 | B1 * | 12/2013 | Ross et al. | 382/118 |
| 2006/0140455 | A1 * | 6/2006 | Costache et al. | 382/118 |
| 2009/0002514 | A1 * | 1/2009 | Steinberg et al. | 348/222.1 |
| 2013/0247175 | A1 * | 9/2013 | Nechyba et al. | 726/19 |

\* cited by examiner

*Primary Examiner* — Anand Bhatnagar
(74) *Attorney, Agent, or Firm* — Cantor Colburn LLP (57) ABSTRACT

A human face recognition method and apparatus are provided. A processor of the human face recognition apparatus calculates red, green, and blue component statistic information for each of a plurality of human face images. The processor uses an independent component analysis algorithm to analyze component statistic information of two colors and derive a piece of first component information and a piece of second component information. The processor transforms the pieces of first component information and second component information into a frequency domain to derive a piece of first frequency-domain information and a piece of second frequency-domain information. The processor calculates an energy value of the first frequency-domain information within a frequency range. The energy value is used to decide whether the human face images are captured from a human being.

17 Claims, 5 Drawing Sheets

HUMAN FACE RECOGNITION METHOD AND APPARATUS

This application claims priority to Taiwan Patent Application No. 100140462 filed on Nov. 7, 2011.

CROSS-REFERENCES TO RELATED APPLICATIONS

Not applicable.

BACKGROUND OF THE INVENTION

1. Field of the Invention

The present invention relates to a human face recognition method and a human face recognition apparatus; more particularly, the present invention relates to a human face recognition method and a human face recognition apparatus that adopt an independent component analysis algorithm.

2. Descriptions of the Related Art

Owing to the rapid development of multimedia technologies in recent years, human face recognition technologies have been widely used in various application fields, such as computer games, monitoring systems, and so on. Human face recognition technologies are used not only to recognize whether a human face is shown in an image but also to determine whether the human face in the image is captured from a human being or not.

The conventional human face recognition technologies utilize a plurality of human face images to determine whether the human faces in these images are captured from a human being or not. Specifically, the conventional human face recognition technologies determine whether eyes of a human being are shown in the human face images and then determine whether there is a "blinking" action accordingly. If there is a "blinking" action, it means that the human face images are captured from a human being. On the contrary, if there is no "blinking" action in the human face images, it means that the human face images are captured from a manikin.

Since the conventional human face recognition technologies have to determine whether eyes of a human being are shown in the human face images, high-definition images must be used in order to obtain an accurate result. When the definition of the images is low, the false rate will increase significantly.

Accordingly, there is an urgent need in this field to provide a technology that can determine whether human face images are captured from a human being or not without being restricted by the definition of the images.

SUMMARY OF THE INVENTION

To solve the aforesaid problem, the present invention provides a human face recognition method and a human face recognition apparatus.

The human face recognition method disclosed in the present invention is for use in an electronic device. The electronic device comprises a processor and a memory unit and both of them are electrically connected to each other. The memory unit has a plurality of human face images stored therein. The human face recognition method comprises the steps of: (a) enabling the processor to calculate a piece of red component statistic information, a piece of green component statistic information, and a piece of blue component statistic information for each of the human face images, (b) enabling the processor to process at least two colors of the pieces of red component statistic information, the pieces of green component statistic information, and the pieces of blue component statistic information by an independent component analysis algorithm so as to derive a piece of first component information and a piece of second component information, (c) enabling the processor to derive a piece of first frequency-domain information and a piece of second frequency-domain information by respectively transforming the piece of first component information and the piece of second component information into a frequency domain, and (d) enabling the processor to calculate an energy value of the piece of first frequency-domain information within a frequency range, and (e) enabling the processor to decide whether the human face images are captured from a human being by comparing the energy value with a preset value.

The human face recognition apparatus disclosed in the present invention comprises a processor and a memory unit and both of them are electrically connected to each other. The memory unit has a plurality of human face images stored therein. The processor is configured to calculate a piece of red component statistic information, a piece of green component statistic information, and a piece of blue component statistic information for each of the human face images. The processor is further configured to process at least two colors of the pieces of red component statistic information, the pieces of green component statistic information, and the pieces of blue component statistic information by an independent component analysis algorithm so as to derive a piece of first component information and a piece of second component information. The processor is further configured to derive a piece of first frequency-domain information and a piece of second frequency-domain information by respectively transforming the piece of first component information and the piece of second component information into a frequency domain. The processor is further configured to calculate an energy value of the piece of first frequency information within a frequency range. The processor is further configured to decide whether the human face images are captured from a human being by comparing the energy value with a preset value.

According to the human face recognition method and the human face recognition apparatus of the present invention, pieces of statistic information of different color components of a plurality of human face images are processed by an independent component analysis algorithm to derive a piece of first component information and a piece of second component information. Afterwards, the piece of first component information and the piece of second component information are individually transformed into a frequency-domain to analyze an energy value in the frequency-domain. Finally, whether the human face images are captured from a human being is determined according to the energy value. Briefly speaking, the present invention analyzes the pieces of statistic information of the color components in the human face images before performing subsequent processing and determination. Since each color component is derived from the human face images but not from only a small portion of each of the images, the covered information is more accurate. Thereby, even poor definition of the images will not affect results of the subsequent processing and determination.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the human face recognition apparatus and the human face recognition method of the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1:
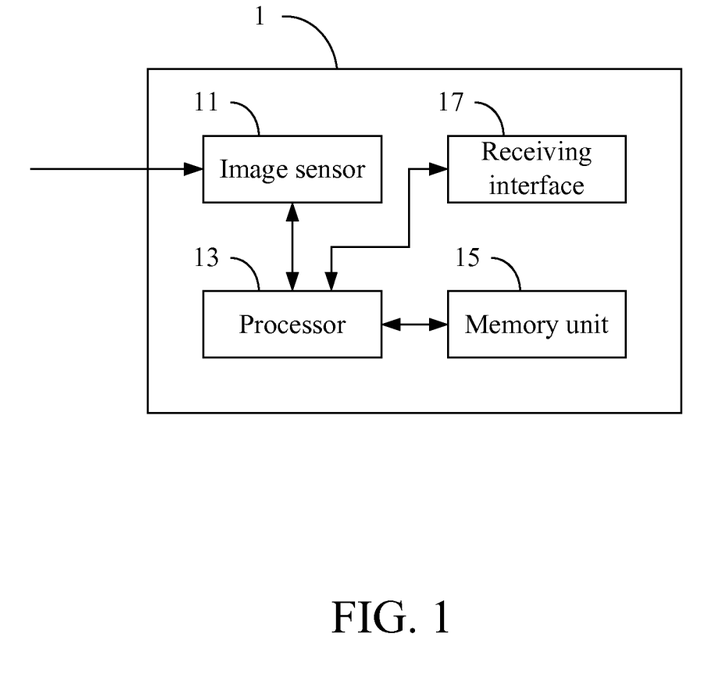
FIG. 1 is a schematic view illustrating internal components of a human face recognition method according to a first embodiment of the present invention.

A first embodiment of the present invention is a human face recognition apparatus 1, internal components of which are schematically shown in FIG. 1. The human face recognition apparatus 1 comprises an image sensor 11, a processor 13, a memory unit 15, and a receiving interface 17. The processor 13 is electrically connected to the image sensor 11, the memory unit 15, and the receiving interface 17. The image sensor 11 may be a webcam or other devices having image capturing functions, which is well known to those of ordinary skill in the art. The processor 13 may be any of various processors, central processing units (CPUs), microprocessors, or other computing devices well known to those of ordinary skill in the art. The memory unit 15 may be a memory, a floppy disk, a hard disk, a compact disk (CD), a mobile disk, a magnetic tape, a database accessible to networks, or any other storage media with the same function and well known to those of ordinary skill in the art.

Firstly, the image sensor 11 captures a plurality of images within a time interval. For each of the images captured by the image sensor 11, the processor 13 performs human face detection. If the detection result reveals that a human face is found, the processor 13 regards the image that is being detected as a human face image and stores it into the memory unit 15. On the contrary, if the detection result reveals that no human face is found, the image being detected is discarded by the processor 13. How the processor 13 detects whether a human face is shown in an image is well known to those of ordinary skill in the art and is not the focus of attention in the present invention, so the details of this portion will not be further described. Herein, it is presumed that a plurality of human face images have been stored in the memory unit 15 after the image sensor 11 and the processor 13 perform the aforesaid functions.

It shall be appreciated that the human face recognition apparatus may not be provided with the image sensor 11 in other embodiments of the present invention. In those scenarios, the user may store a plurality of human face images into the memory unit 15 in advance.

Then, the processor 13 calculates a piece of red component statistic information, a piece of green component statistic information, and a piece of blue component statistic information for each of the human face images. An example is given below to demonstrate how the piece of red component statistic information, the piece of green component statistic information, and the piece of blue component statistic information are calculated. For instance, the processor 13 may separate the red component, the green component, and the blue component of each of the human face images. After all the human face images are processed, a plurality of red component images, a plurality of green component images, and a plurality of blue component images are obtained.

For each of the red component images, the processor 13 may derive a piece of red component information by performing calculation on the red component image being processed. After all the red component images are processed, a plurality of pieces of red component information are obtained. Similarly, for each of the green component images, the processor 13 may derive a piece of green component information by performing calculation on the green component image being processed. After all the green component images are processed, a plurality of pieces of green component information are obtained. Likewise, for each of the blue component images, the processor 13 may derive a piece of blue component information by performing calculation on the blue component image being processed. After all the blue component images are processed, a plurality of pieces of blue component information are obtained.

For instance, each of the pieces of red component information may be an average luminance value, a maximum luminance value, a minimum luminance value, or some other statistic value of the corresponding red component image. For example, each of the pieces of green component information may be an average luminance value, a maximum luminance value, a minimum luminance value, or some other statistic value of the corresponding green component image. For example, each of the pieces of blue component information may be an average luminance value, a maximum luminance value, a minimum luminance value, or some other statistic value of the corresponding blue component image.

After the pieces of red component information, the pieces of green component information, and the pieces of blue component information are obtained, the processor 13 chooses pieces of component information of two colors for subsequent processing. It is presumed that the pieces of red component information and the pieces of green component information are chosen in this embodiment. Then, the processor 13 processes the pieces of red component information and the pieces of green component information by using an independent component analysis algorithm to derive a piece of first component information and a piece of second component information. It shall be appreciated that the independent component analysis algorithm is an algorithm already known in the art. The independent component analysis algorithm will output two sets of output data when there are two sets of input data, which is also well known to those of ordinary skill in the art. It is noted that the terms "first" and "second" set forth in the "first component information" and the "second component information" are only used to distinguish the piece of first component information and the piece of second component information from each other.

The purpose of using the independent component analysis algorithm is to separate human heart-beat signals from other signals in the piece of red component information and the piece of green component information. In other words, one of the piece of first component information and the piece of second component information may be viewed as a human heart-beat signal of a human being. Human heart-beat signals have a special feature that the signal energy thereof is relatively high within a specific frequency range. In this embodiment, the specific frequency range is used as a preset frequency range for use in subsequent processing. Generally speaking, heart-beat signals of most people have a low frequency, so this preset frequency range may be set in a low-frequency range.

Specifically, the processor 13 then derives a piece of first frequency-domain information and a piece of second frequency-domain information by respectively transforming the piece of first component information and the piece of second component information into a frequency domain. For instance, the processor 13 may derive the piece of first frequency-domain information and the piece of second frequency-domain information by respectively performing a fast Fourier transform on the piece of first frequency component and the piece of second component information. In other embodiments of the present invention, the human face recognition apparatus may also adopt other frequency-domain transform algorithms.

Next, the processor 13 calculates an energy value of the piece of first frequency-domain information within the preset frequency range and compares the energy value with a preset value. If the energy value of the piece of first frequency-domain information within the preset frequency range is greater than the preset value, it means that the human face images stored in the memory unit 15 are captured from a human being. If the energy value of the piece of first frequency-domain information within the preset frequency range is smaller than the preset value, the processor 13 calculates an energy value of the piece of second frequency-domain information within the preset frequency range and compares the energy value with the preset value. If the energy value of the piece of second frequency-domain information within the preset frequency range is greater than the preset value, then it may be determined that the human face images stored in the memory unit 15 are captured from a human being. If the energy value of the piece of first frequency-domain information within the preset frequency range is smaller than the preset value and the energy value of the piece of second frequency-domain information within the preset frequency range is smaller than the preset value, then the human face images stored in the memory unit 15 are captured from a manikin. Briefly speaking, it can be determined that the human face images stored in the memory unit 15 are captured from a human being as long as the energy value of one of the piece of first frequency-domain information and the piece of second frequency-domain information is greater than the preset value.

If the processor 13 determines that the human face images are captured from a human being according to a result of the aforesaid processing, the human face recognition apparatus 1 may proceed to a login procedure. Specifically, the receiving interface 17 receives a login signal and the processor 13 further processes the login signal. For instance, if the login signal comprises an account number and a password of the user, the processor 13 determines whether the account number and the password are correct. However, if the processor 13 determines that the human face images are captured from a manikin according to a result of the aforesaid processing, the human face recognition apparatus 1 will not proceed to the login procedure.

A second embodiment of the present invention is also a human face recognition apparatus 1. However, detailed operations of the human face recognition apparatus 1 of the second embodiment differ slightly from those of the first embodiment. Hereinbelow, only differences between the second embodiment and the first embodiment will be described.

In the second embodiment, the processor 13 processes the pieces of component information of all colors after obtaining the pieces of red component information, the pieces of green component information, and the pieces of blue component information. Then, the processor 13 processes the pieces of red component information, the pieces of green component information, and the pieces of blue component information by using an independent component analysis algorithm to derive a piece of first component information, a piece of second component information, and a piece of third component information. It shall be appreciated that the independent component analysis algorithm is an algorithm already known in the art. It is well known that the independent component analysis algorithm will output three sets of output data when there are three sets of input data. It is noted that the terms "first," "second," and "third" set forth in the "first component information," the "second component information," and the "third component information" are only used to distinguish the first component information, the second component information, and the third component information from each other.

Since the processor 13 in this embodiment chooses the pieces of component information of all the three colors for subsequent processing, the independent component analysis algorithm separates the human heart-beat signals, human movement (or swaying) signals, and other signals in the pieces of red component information, the pieces of green component information and the pieces of blue component information. In other words, one of the piece of first component information, the piece of second component information, and the piece of third component information may be viewed as a human heart-beat signal.

The processor 13 derives a piece of first frequency-domain information, a piece of second frequency-domain information, and a piece of third frequency-domain region by respectively transforming the piece of first component information, the piece of second component information, and the piece of third component information into a frequency domain. The processor 13 then calculates an energy value of the first frequency-domain information within the preset frequency range, an energy value of the second frequency-domain information within the preset frequency range, and an energy value of the third frequency-domain information within the preset frequency range. It can be determined that the human face images stored in the memory unit 15 are captured from a human being as long as the energy value of one of the piece of first frequency-domain information, the piece of second frequency-domain information and the piece of third frequency-domain information is greater than the preset value.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment and thus will not be further described herein.

Figure 2A:
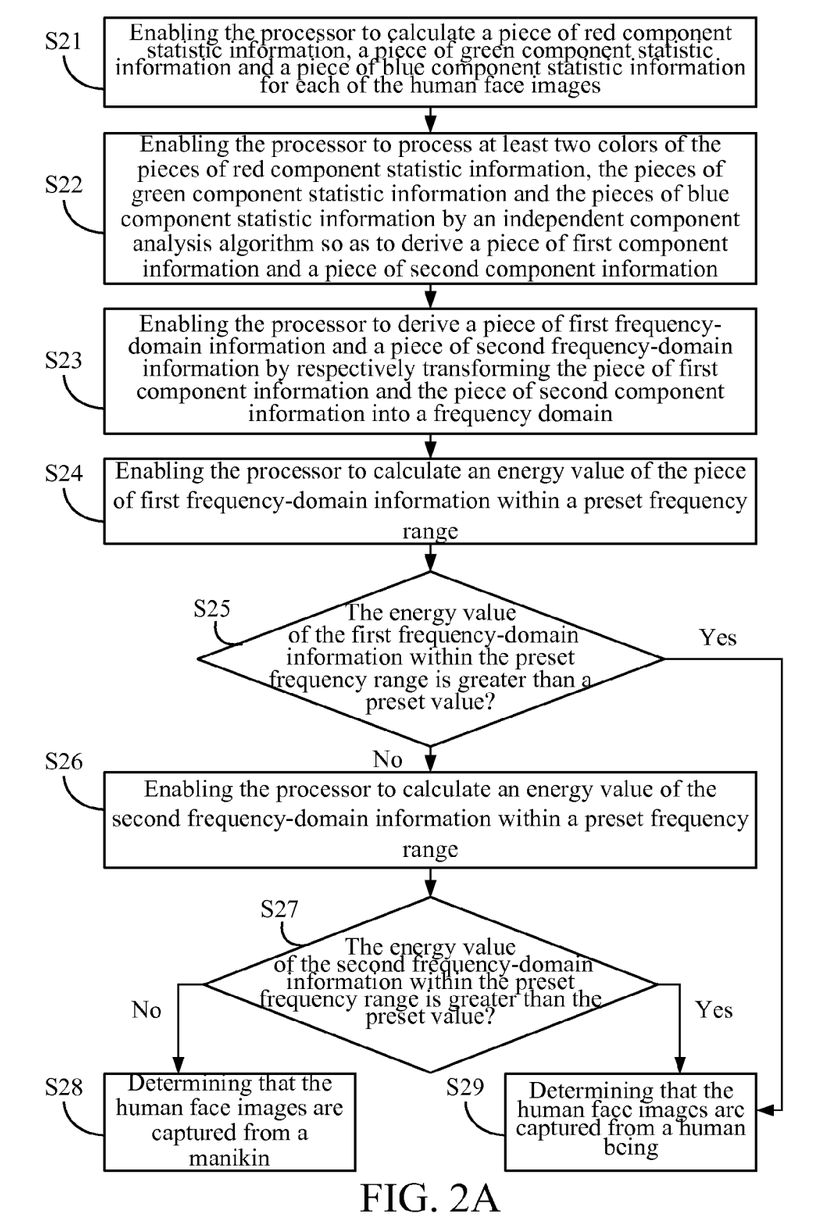
FIGS. 2A and FIG. 2B are a flowchart of a human face recognition method according to a third embodiment of the present invention.
Figure 2B:
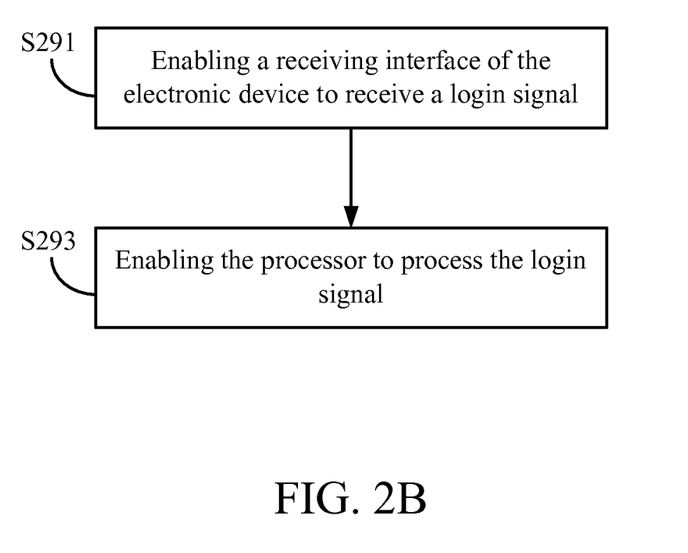

A third embodiment of the present invention is a human face recognition method, a flowchart diagram of which is shown in FIG. 2A and FIG. 2B. The human face recognition method is for use in an electronic device, such as the human face recognition apparatuses 1 of the first embodiment and the second embodiment. The electronic device comprises a processor and a memory unit having a plurality of human face images stored therein. The processing and the memory unit are electrically connected with each other.

Firstly, step S21 is executed to enable the processor to calculate a piece of red component statistic information, a piece of green component statistic information, and a piece of blue component statistic information for each of the human face images.

Figure 2C:
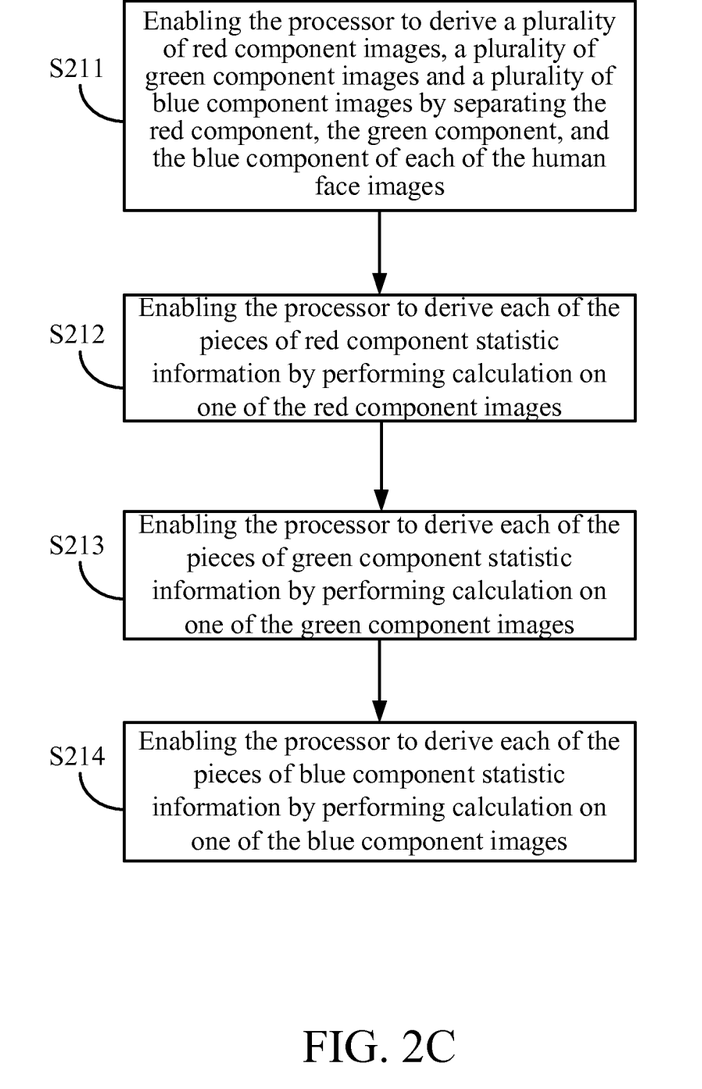
FIG. 2C is a detailed flowchart of the step 21 in the third embodiment.

For example, the step S21 may be accomplished by the steps shown in a detailed flowchart diagram depicted in FIG. 2C. Specifically, step S211 is executed to enable the processor to derive a plurality of red component images, a plurality of green component images, and a plurality of blue component images by separating the red component, the green component, and the blue component of each of the human face images. Then, step S212 is executed to enable the processor to derive each of the pieces of red component statistic information by performing calculation on one of the red component images. Step S213 is executed to enable the processor to derive each of the pieces of green component statistic information by performing calculation on one of the green component images. Step S214 is executed to enable the processor to derive each of the pieces of blue component statistic information by performing calculation on one of the blue component images. It shall be appreciated that this embodiment has no limitation on the execution order of the steps S212, S213, and S214. Furthermore, each of the pieces of red component statistic information may be an average luminance value, a maximum luminance value, a minimum luminance value, or some other statistic value of the corresponding red component image. Each of the pieces of green component statistic information may be an average luminance value, a maximum luminance value, a minimum luminance value, or some other statistic value of the corresponding green component image. Each of the pieces of blue component statistic information may be an average luminance value, a maximum luminance value, a minimum luminance value, or some other statistic value of the corresponding blue component image.

Upon completion of the step S21, step S22 is executed to enable the processor to process at least two colors of the pieces of red component statistic information, the pieces of green component statistic information, and the pieces of blue component statistic information by an independent component analysis algorithm so as to derive a piece of first component information and a piece of second component information.

Next, step S23 is executed to enable the processor to derive a piece of first frequency-domain information and a piece of second frequency-domain information by respectively transforming the piece of first component information and the piece of second component information into a frequency domain. For instance, the Fourier transform algorithm may be used by the processor in the step S23.

Afterwards, step S24 is executed to enable the processor to calculate an energy value of the piece of first frequency-domain information within a preset frequency range. Next, step S25 is executed to enable the processor to determine whether the energy value of the piece of first frequency-domain information within the preset frequency range is greater than a preset value. If the determination result of the step S25 is "yes," step S29 is executed next to enable the processor to determine that the human face images are captured from a human being. If the determination result of the step S25 is "no," step S26 is then executed to enable the processor to calculate an energy value of the second frequency-domain information within a preset frequency range. Following that, step S27 is executed to enable the processor to determine whether the energy value of the second frequency-domain information within the preset frequency range is greater than the preset value. If the determination result of the step S27 is "yes," then step S29 is executed to enable the processor to determine that the human face images are captured from a human being. If the determination result of the step S27 is "no," step S28 is then executed to enable the processor to determine that the human face images are captured from a manikin.

It shall be appreciated that the steps S24 to S29 may also be replaced by other steps. For instance, an energy value of the first frequency-domain information within a preset frequency range and an energy value of the second frequency-domain information within a preset frequency range are calculated. Then, a greater one of the two energy values is chosen for subsequent comparison. If the greater one of the two energy values is greater than the preset value, then the processor can determine that the human face images are captured from a human being. If the greater one of the two energy values is smaller than the preset value, the processor can determine that the human face images are captured from a manikin.

If the determination result of the step S27 is "yes" and then step S29 is executed accordingly, the human face recognition method may proceed to a login procedure. Specifically, step S291 may be further executed to enable a receiving interface of the electronic device to receive a login signal. Next, step S293 is executed to enable the processor to process the login signal. For example, if the login signal comprises an account number and a password of the user, the processor determines whether the account number and the password are correct in the step S293. However, if the determination result of the step S27 is "yes" and then the step S28 is executed accordingly, the human face recognition method will not proceed to the login procedure.

In addition to the aforesaid steps, the third embodiment can also execute all the operations and functions set forth in the first embodiment. How the third embodiment executes these operations and functions will be readily appreciated by those of ordinary skill in the art based on the explanation of the first embodiment, and thus will not be further described herein.

Figure 3:
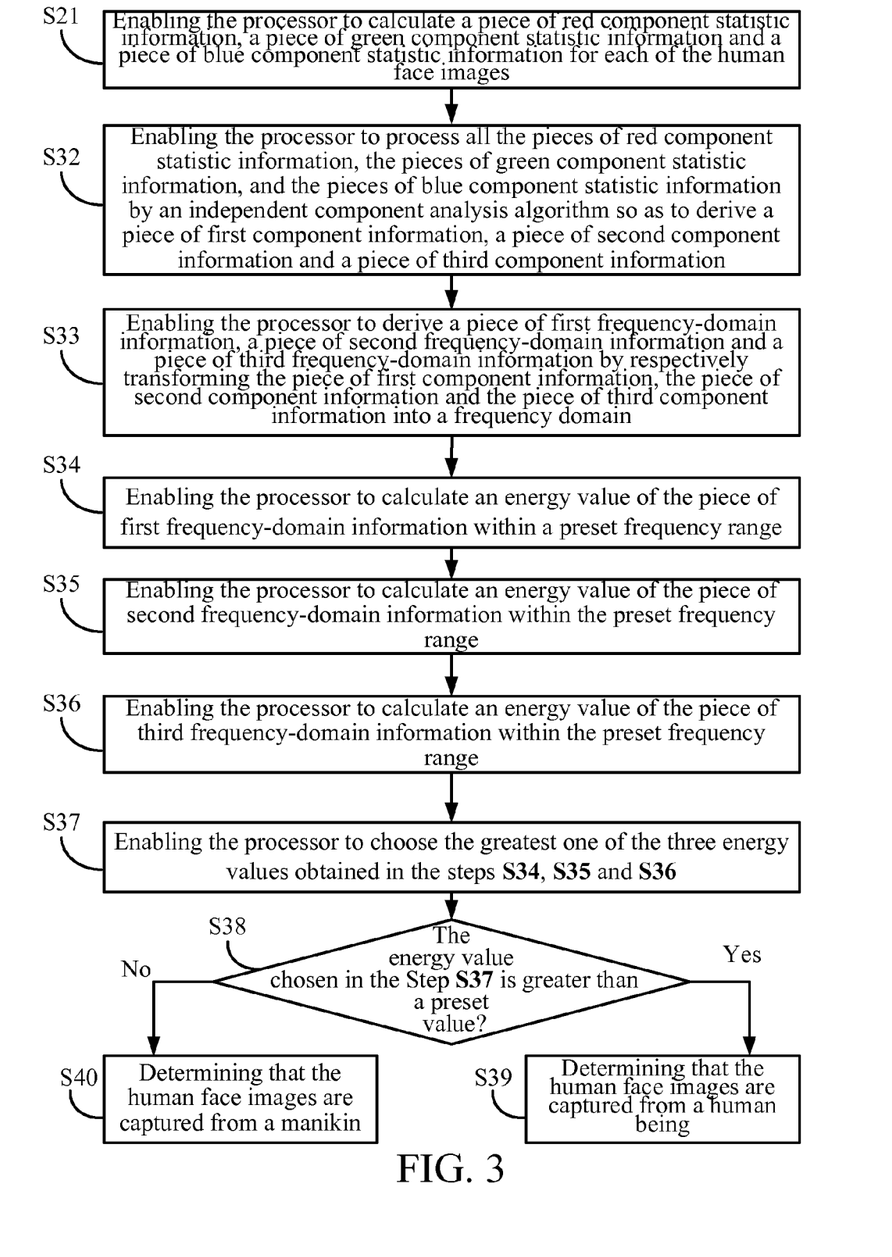
FIG. 3 is a flowchart of a human face recognition method according to a fourth embodiment of the present invention.

A fourth embodiment of the present invention is a human face recognition method, a flowchart diagram of which is shown in FIG. 3. The human face recognition method is for use in an electronic device, e.g., the human face recognition apparatus 1 of the first embodiment or the second embodiment. The electronic device comprises a processor and a memory unit having a plurality of human face images stored therein. The processor and the memory unit are electrically connected with each other. The detailed operations of the fourth embodiment differ slightly from those of the third embodiment, and only the differences therebetween will be described in detail hereinbelow.

Similar to the third embodiment, step S21 is firstly executed in the human face recognition method of the fourth embodiment to enable the processor to calculate a piece of red component statistic information, a piece of green component statistic information, and a piece of blue component statistic information for each of the human face images. The step S21 may also be accomplished through the steps S211, S212, S213 and S214 shown in FIG. 2C.

Then, step S32 is executed to enable the processor to process all the pieces of red component statistic information, the pieces of green component statistic information, and the pieces of blue component statistic information by an independent component analysis algorithm so as to derive a piece of first component information, a piece of second component information, and a piece of third component information. Next, step S33 is executed to enable the processor to derive a piece of first frequency-domain information, a piece of second frequency-domain information, and a piece of third frequency-domain information by respectively transforming the piece of first component information, the piece of second component information, and the piece of third component information into a frequency domain.

Afterwards, steps S34, S35 and S36 are executed to enable the processor to calculate an energy value of each of the piece of first frequency-domain information, the piece of second frequency-domain information, and the piece of third frequency-domain information within a preset frequency range, respectively. It shall be appreciated that the fourth embodiment has no limitation on the execution order of the steps S34, S35 and S36. Then, step S37 is executed to enable the processor to choose the greatest one of the three energy values obtained in the steps S34, S35 and S36 for use in subsequent processing.

Afterwards, step S38 is executed to enable the processor to determine whether the energy value chosen in the step S37 is greater than the preset value. If the determination result of the step S37 is "yes," then step S39 is executed to enable the processor to determine that the human face images are captured from a human being. On the contrary, if the determination result of the step S37 is "no," step S40 is executed next to enable the processor to determine that the human face images are captured from a manikin.

Similarly, the steps S34 to S40 of the fourth embodiment may also be replaced by other steps. For instance, an energy value of one of the piece of first frequency-domain information, the piece of second frequency-domain information, and the piece of third frequency-domain information within the preset frequency range is calculated and then it is determined whether the energy value is greater than a preset value. If the determination result is "yes", then it means that the human face images are captured from a human being and the process is ended. However, if the determination result is "no," an energy value of another piece of frequency-domain information is calculated for comparison with the preset value. If the energy value of each of the pieces of frequency-domain information is no greater than the preset value, it means that the human face images are captured from a manikin.

In addition to the aforesaid steps, the fourth embodiment can also execute all the operations and functions set forth in the second embodiment. How the fourth embodiment executes these operations and functions will be readily appreciated by those of ordinary skill in the art based on the explanation of the second embodiment, and thus will not be further described herein.

The human face recognition methods described in the third and the fourth embodiments may each be implemented by a computer program product. When the computer program product is loaded into an electronic device or a human face recognition apparatus and a plurality of codes comprised in the computer program product is executed, the human face recognition methods described in the third and the fourth embodiments can be accomplished. This application program may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions of the first to the fourth embodiments of the present invention, pieces of statistic information of different color components of a plurality of human face images are processed by an independent component analysis algorithm to derive a piece of first component information and a piece of second component information. The piece of first component information and the piece of second component information may be viewed as human heart-beat signals. Then, the piece of first component information and the piece of second component information are transformed into a frequency domain to analyze an energy value of each of the piece of first frequency-domain information and the piece of second frequency-domain information within a frequency range. Finally, whether the human face images are captured from a human being or not is determined according to the energy values.

Briefly speaking, the present invention analyzes the pieces of statistic information of the color components in the human face images before performing subsequent processing and determination. Since the color components are from the human face images but not from only a small part of each of the images, the information covered is more accurate. Thereby, even poor definition of the images will not affect results of the subsequent processing and determination.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A human face recognition method for use in an electronic device, the electronic device comprising a processor and a memory unit, the memory unit having a plurality of human face images stored therein, the human face recognition method comprising the steps of:
   (a) enabling the processor to calculate a piece of red component statistic information, a piece of green component statistic information, and a piece of blue component statistic information for each of the human face images;
   (b) enabling the processor to process at least two colors of the pieces of red component statistic information, the pieces of green component statistic information, and the pieces of blue component statistic information by an independent component analysis algorithm so as to derive a piece of first component information and a piece of second component information;
   (c) enabling the processor to derive a piece of first frequency-domain information and a piece of second frequency-domain information by respectively transforming the piece of first component information and the piece of second component information into a frequency domain;
   (d) enabling the processor to calculate an energy value of the piece of first frequency-domain information within a frequency range; and
   (e) enabling the processor to decide whether the human face images are captured from a human being by comparing the energy value with a preset value.

2. The human face recognition method of claim 1, wherein the step (a) comprises the steps of:
   (a1) enabling the processor to derive a plurality of red component images, a plurality of green component images, and a plurality of blue component images by separating the red component, the green component, and the blue component of each of the human face images;
   (a2) enabling the processor to derive each of the pieces of red component statistic information by performing calculation on one of the red component images;
   (a3) enabling the processor to derive each of the pieces of green component statistic information by performing calculation on one of the green component images; and (a4) enabling the processor to derive each of the pieces of blue component statistic information by performing calculation on one of the blue component images.

3. The human face recognition method of claim 2, wherein each of the pieces of red component statistic information is an average luminance value of the corresponding red component image, each of the pieces of green component statistic information is an average luminance value of the corresponding green component image, and each of the pieces of blue component statistic information is an average luminance value of the corresponding blue component image.

4. The human face recognition method of claim 1, wherein the step (b) enables the processor to process the pieces of red component statistic information, the pieces of green component statistic information, and the pieces of blue component statistic information by the independent component analysis algorithm so as to derive the piece of first component information, the piece of second component information, and a piece of third component information, and the step (c) further enables the processor to derive a piece of third frequency-domain information by transforming the piece of third component information into the frequency domain.

5. The human face recognition method of claim 1, wherein the step (c) enables the processor to derive the piece of first frequency-domain information and the piece of second frequency-domain information by respectively performing a fast Fourier transform on the piece of first component information and the piece of second component information.

6. The human face recognition method of claim 1, wherein the step (e) decides that the human face images are captured from the human being when the energy value is greater than the preset value.

7. The human face recognition method of claim 1, wherein the step (e) decides that the human face images are captured from a manikin when the energy value is smaller than the preset value.

8. The human face recognition method of claim 1, wherein the step (e) decides that the human face images are captured from the human being and the human face recognition method further comprises the steps of:
    enabling a receiving interface of the electronic device to receive a login signal; and
    enabling the processor to process the login signal.

9. A human face recognition apparatus, comprising:
    a memory unit, having a plurality of human face images stored therein; and
    a processor, being electrically connected to the memory unit and configured to:
        calculate a piece of red component statistic information, a piece of green component statistic information, and a piece of blue component statistic information for each of the human face images,
        process at least two colors of the pieces of red component statistic information, the pieces of green component statistic information, and the pieces of blue component statistic information by an independent component analysis algorithm so as to derive a piece of first component information and a piece of second component information,
        derive a piece of first frequency-domain information and a piece of second frequency-domain information by respectively transforming the piece of first component information and the piece of second component information into a frequency domain,
        calculate an energy value of the piece of first frequency information within a frequency range, and
        decide whether the human face images are captured from a human being by comparing the energy value with a preset value.

10. The human face recognition apparatus of claim 9, wherein the processor derives a plurality of red component images, a plurality of green component images, and a plurality of blue component images by separating the red component, the green component, and the blue component of each of the human face images, the processor derives each of the pieces of red component statistic information by performing calculation on one of the red component images, the processor derives each of the pieces of green component statistic information by performing calculation on one of the green component images, and the processor derives each of the pieces of blue component statistic information by performing calculation on one of the blue component images.

11. The human face recognition apparatus of claim 10, wherein each of the pieces of red component statistic information is an average luminance value of the corresponding red component image, each of the pieces of green component statistic information is an average luminance value of the corresponding green component image, and each of the pieces of blue component statistic information is an average luminance value of the corresponding blue component image.

12. The human face recognition apparatus of claim 9, wherein the processor processes the pieces of red component statistic information, the pieces of green component statistic information, and the pieces of blue component statistic information by the independent component analysis algorithm so as to derive the piece of first component information, the piece of second component information, and a piece of third component information, and the processor further derives a piece of third frequency-domain information by transforming the piece of third component information into the frequency domain.

13. The human face recognition apparatus of claim 9, wherein the processor derives the piece of first frequency-domain information and the piece of second frequency-domain information by respectively performing a fast Fourier transform on the piece of first frequency component and the piece of second component information.

14. The human face recognition apparatus of claim 9, wherein the processor decides that the human face images are captured from the human being when the energy value is greater than the preset value.

15. The human face recognition apparatus of claim 9, wherein the processor decides that the human face images are captured from a manikin when the energy value is smaller than the preset value.

16. The human face recognition apparatus of claim 9, further comprising:
    an image sensor, being configured to capture a plurality of images;
    wherein the processor further derives the human face images by performing human face detection on each of the images.

17. The human face recognition apparatus of claim 9, further comprising:
    a receiving interface, being electrically connected with the processor and configured to receive a login signal when the processor decides that the human face images are captured from the human being;
    wherein the processor further processes the login signal.

* * * * *